United States Patent [19]
Satake et al.

[11] Patent Number: 5,603,006
[45] Date of Patent: Feb. 11, 1997

[54] CACHE CONTROL UNIT USING A PLURALITY OF REQUEST STACKS

[75] Inventors: Joji Satake; Atsushi Tanaka, both of Hadano, Japan

[73] Assignee: Hitachi, Ltd., Tokyo, Japan

[21] Appl. No.: 313,389

[22] Filed: Sep. 27, 1994

[30]  Foreign Application Priority Data

Sep. 27, 1993 [JP] Japan .................................. 5-239356

[51] Int. Cl.[6] .................................................. G06F 12/08
[52] U.S. Cl. ......................... 395/459; 395/457; 395/479; 395/490
[58] Field of Search ................................. 395/457, 459, 395/425, 479, 403, 405, 415, 480, 490; 364/200 MS File, 900 MS File

[56]  References Cited

U.S. PATENT DOCUMENTS

| | | | |
|---|---|---|---|
| 3,581,291 | 5/1971 | Iwamoto | 395/425 |
| 4,392,200 | 7/1983 | Arulpragasam et al. | 395/425 |
| 5,018,063 | 5/1991 | Liu | 395/650 |
| 5,140,682 | 8/1992 | Okura et al. | 395/425 |
| 5,247,649 | 9/1993 | Bandoh | 395/425 |
| 5,251,308 | 10/1993 | Frank et al. | 395/490 |
| 5,317,720 | 5/1994 | Stamm et al. | 395/470 |
| 5,377,341 | 12/1994 | Kaneko et al. | 395/425 |
| 5,398,325 | 3/1995 | Chang et al. | 395/425 |

*Primary Examiner*—Matthew M. Kim
*Attorney, Agent, or Firm*—Antonelli, Terry, Stout & Kraus, LLP

[57]  ABSTRACT

A cache memory control unit includes plural banks composing a cache memory, an address array for feeding a hit signal or a mishit signal indicating whether or not the corresponding data is stored in the cache memory in response to the access requests received from plural instruction processors couples to the cache memory, and a data transfer requester for sending out a data transfer request to the main storage in response to a mishit signal. Each of the banks includes a first stack for holding an access request according to the access request and the hit signal, and a transfer data monitor for monitoring the data sent out of the main storage according to the data transfer request for the main storage, accessing each of the banks based on the access request from the first stack if the data is not being sent, and sending out the data from the bank to any one of plural instruction processors.

10 Claims, 3 Drawing Sheets

5,603,006

CACHE CONTROL UNIT USING A PLURALITY OF REQUEST STACKS

BACKGROUND OF THE INVENTION

The present invention relates to a cache memory control unit provided in an information processing apparatus, and, more particularly, to a cache memory control unit which is arranged to improve a throughput if requests from plural instruction processors are required to be processed.

The current large or medium-scale general-purpose computer mainly employs a tightly-coupled multiprocessor arrangement in which plural instruction processors share a main memory. Further, in principle, a main memory has a slower processing speed than an instruction processor. The performance of such a general-computer therefore depends on the throughput of the referencing/writing data operations in the main memory.

As one of the means for solving this short-coming, a system has been proposed in which a cache memory control unit provides a cache memory to be shared by plural instruction processors between the instruction processor and the main memory. U.S. Pat. No. 5,070,444 discloses a device in which a cache memory address section is divided into plural banks so that each bank receives the corresponding requests if plural instruction processors request to access their corresponding banks. This device, hence, is capable of processing the requests from the plural instruction processors in parallel.

Generally, a cache storage CS5 contained in the cache control unit 3 is formed on a different implemented module from the address array 4. The time duration for reading the cache storage CS will be longer them the request cycle time of accessing data in the instruction processor.

The conventional cache memory control unit does not take into consideration a shortcoming that a reading request interval of a cache memory or a cache storage CS is longer than one machine cycle. That is, if the reading cycle of the cache storage CS is longer than one data access request cycle of an instruction processor, for example, if the instruction processor needs two cycles (FIG. 3A), the request of the instruction processor is made to required to wait at the receiving stage in the cache memory control unit.

The data processing apparatus disclosed in the foregoing US prior art is capable of receiving each request from plural instruction processors at the corresponding bank. But if the previously received request occupies the bank, the subsequent request has to wait at the directory section.

SUMMARY OF THE INVENTION

It is an object of the present invention to provide a cache memory control unit which provides a storage control system for requiring fewer waiting cycles in response to a request from an instruction processor, thereby enhancing throughput of the overall cache memory control unit.

It is a further object of the present invention to provide a cache memory control unit for processing requests from plural instruction processors and having a cache memory built therein, a directory section and a cache memory section separately mounted on their own modules of the cache memory control unit, in which the control method does not bring about a waste cycle of a request slice control circuit or a CS bank though the waste cycle which conventionally takes place if the directory section holds a request and the request slice control circuit is monitering a busy status of CS bank.

To achieve these objects, a cache memory control unit having a cache memory for holding part of data on a main storage composed of plural banks and a directory for holding a main storage address of the data held in the cache memory and having a capability of processing requests from plural instruction processors and accessing the cache memory based on the retrieved result of the directory, provides a request stack for holding plural requests issued from the directory to each bank of the cache memory in the requesting order, means for indicating whether or not the bank is being accessed, and means for inhibiting a request from a request stack to the bank if the bank is busy.

In the cache memory control unit of the present invention, a request receiving circuit included in the directory operates to receive a request without having to determine if the cache bank is busy and send a request to the cache memory together with the referenced result of the directory. The cache memory temporarily holds the request in the corresponding request stack so that the cache memory can efficiently refer to or write data in the cache bank upon the determination as to whether or not the data array is busy.

DESCRIPTION OF THE PREFERRED EMBODIMENTS

Figure 1:
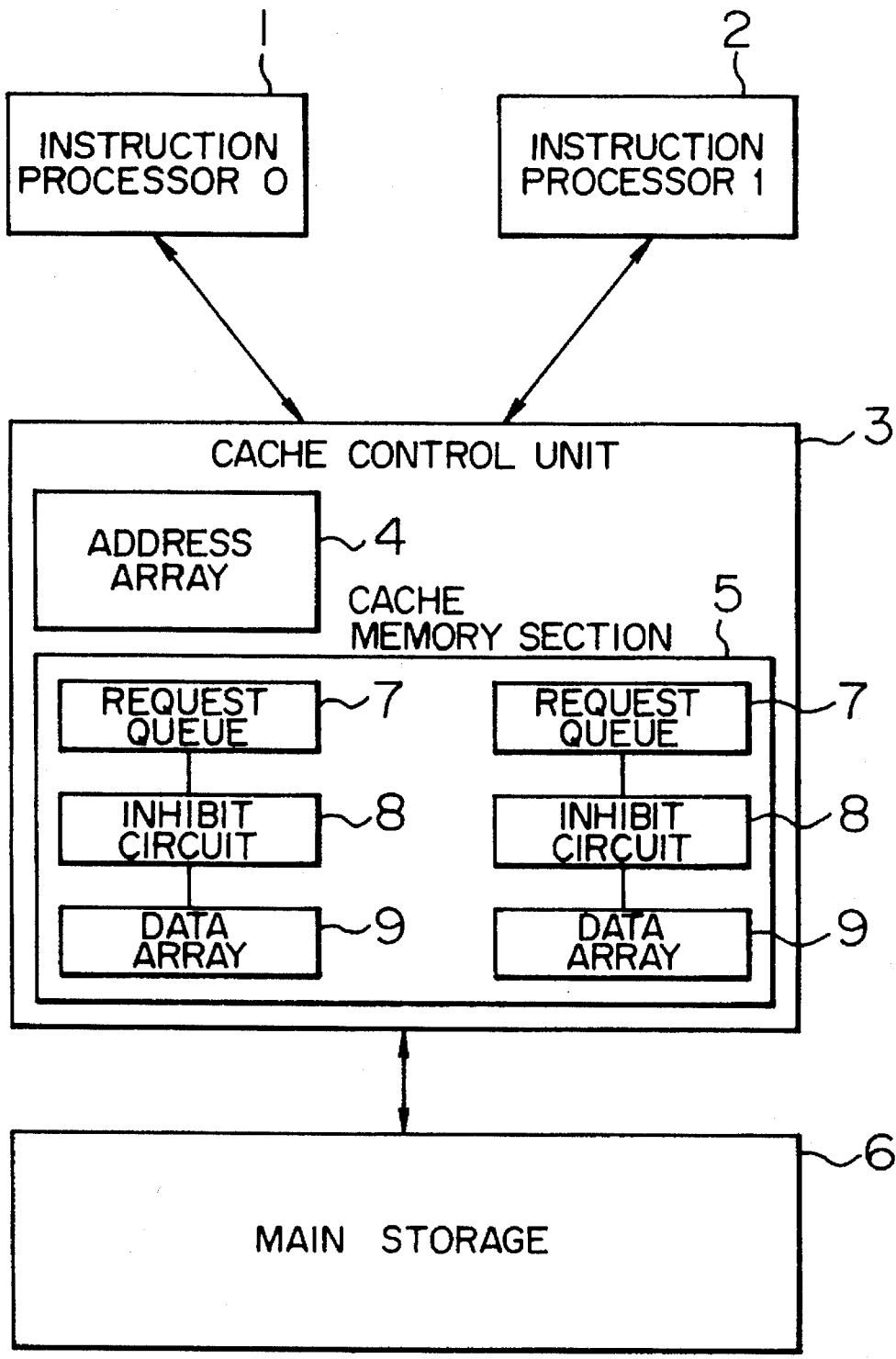
FIG. 1 is a schematic diagram showing a data processing apparatus having a cache memory control unit for processing requests from plural instruction processors.

FIG. 1 shows a cache control unit according to an embodiment of the present invention. The cache control unit is connected to main memory and plural instruction processors (IP's) for improving a data-access throughput. An associative mapping memory, tag, address array, or index directory 4 having a partial bit(s) of the main storage or main memory address operates to select an access request from any one of the IP's and sends it to a request queue of the corresponding bank of the cache memory. The request queue 7 holds plural access requests in a FIFO manner and controls an access request to be sent to a data array according to an inhibit signal from an inhibit circuit 8. The inhibit circuit 8 serves to issue the inhibit signal while data is transferred from a main storage 6 to a cache control unit 3 for inhibiting to sending of request from the request queue 7 to the data array. However, the sending of a request is not prevented while data is transferred to another bank from the main storage.

Figure 2:
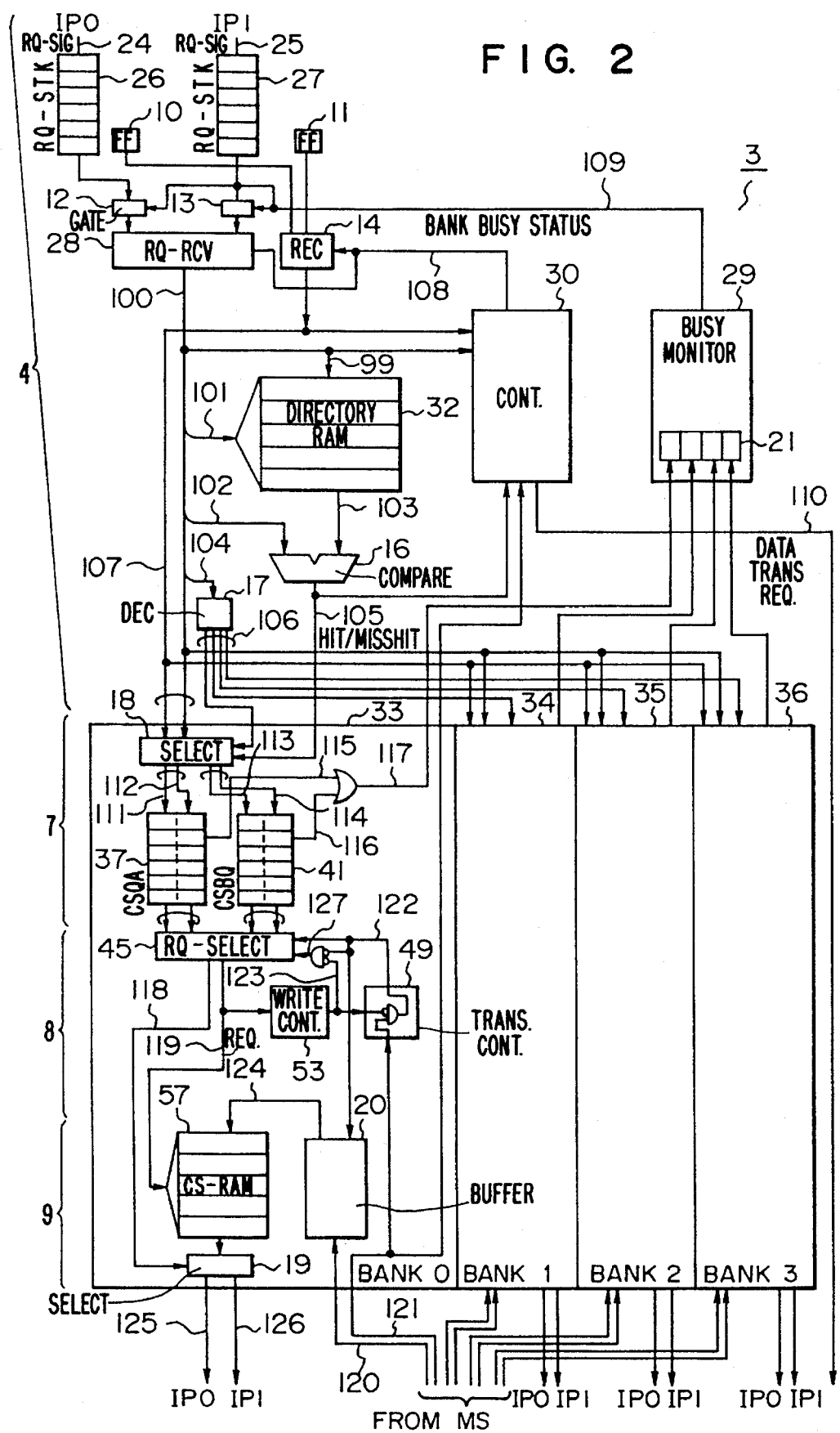
FIG. 2 is a diagram showing a cache memory control unit according to an embodiment of the present invention.

FIG. 2 is a diagram showing a directory or an address array and a cache storage CS included in the storage control unit to which the present invention applies. Herein, the address array includes request stacks 26 and 27 for queuing the requests from the instruction processors IP-0 and IP-1, respectively, a request receiving circuit 28, a stack busy monitoring circuit 29, an MS access control circuit, and a directory RAM 32.

The cache storage CS has four banks (bank 0 to 3) 33 to 36. Each request has a request command and an access address. Since each bank has the same arrangement, the illustrative internal arrangement is that of only the bank 0. Each of the banks 33 to 36 is arranged to have a request queue CSAQ 37 to be used if a cache hit takes place, a request queue CSBQ 41 to be used if a cache mishit takes place, a request selecting circuit 45, a bank busy control circuit 49, a cache data write control circuit 53, and a data array or a cache bank RAM (CSRAM) 57. Herein, the term "cache hit" means the requested data block is in the cache storage and the term "cache mishit" means the data block is not in the cache storage.

Hereafter, the processing to be done if a cache hit or a cache mishit takes place will be roughly described. The more detailed operation will be described later.

(a) If a cache hit takes place,

Consider that a request is issued from the instruction processor IP-0. The request is temporarily saved in the request stack 26 for the IP-0 through a request signal line 24 from IP-0 and then is read by the request receiving circuit 28 for sending it to the destination CS bank. Herein, consider the case that the request is sent to the bank 0. If the requests are sent to plural banks at a time, those banks individually operate in a similar manner.

The bank 0 temporarily saves the received requests in the request queue CSAQ for the cache hit. Then, according to the conditions of the bank busy control circuit 49, the request is sequentially read by the CS request selecting circuit 45 one by one. In response to the read request, the CSRAM 57 is accessed.

Now, consider the three requests 1 to 3 reach the CCU 3, concretely, the requests from IP-0 to the bank 0, from IP-1 to the bank 0, and from IP-1 to the bank 1.

When the request 1 is received by the stack 26, the request 1 is immediately received by the request receiving circuit 28 and then is sent out to the bank 0. When the next request 2 is similarly received by the stack 27, the request is immediately outputted by the request receiving circuit 28 one by one and then is saved in the CSAQ 37 of the bank 0. The request waits there until the RAM 57 becomes ready for access under the control of the cache data write control circuit 53. The request 3 subsequent to the request 2 is similarly received by the stack 27, when the request receiving control circuit 28 is immediately received and then sent to the bank 1. As is understood from the above operation, the request receiving circuit 28 enables to sequentially receive one request at each cycle. Hence, to process these requests 1 to 3, the circuit 28 needs just three cycles.

(b) If a cache mishit takes place

Consider that a request is issued from the instruction processor IP-0. The request is temporarily saved in the request stack 26 for the IP-0 through the request signal line for the IP-0 and then received by the request receiving circuit.28 under the control of the MS access control circuit 30. Then, the request is sent to the destination bank. At the time, the control circuit 30 operates to issue a data transfer request 110 to the MS. Herein, consider that the request is sent to the bank 0. If requests are sent to plural CS banks at a time, those banks individually operate in a similar manner.

The bank 0 saves the received request in the CSBQ 41 since it is a mishit. Under the control of the cache data transfer control circuit 49, after the object data is transferred from the MS, the request is selected by the request selecting circuit 45. Then, the RAM 57 is accessed. If the request is received from the IP-1 before the arrival of data from the MS, the received request is selected by the request selecting circuit 45 through the CSAQ 37. Then, the CSRAM 57 is accessed.

If the cache mishit takes place, the conventional device (for example, the foregoing U.S. Pat. No. 5070444) has to write data on the four banks of the buffer storage data section since the data transfer unit from the MS covers the four banks. If one of the banks is busy, the device needs to prepare an dummy cycle for another bank. On the other hand, like the conventional device, the cache memory control unit according to the embodiment of the invention has to write the data from the MS to all the four banks after the arrival of the data. Unlike the conventional device, however, the cache memory control unit does not need to write the data on all the four banks at a time. That is, since the request is held in the request queue CSBQ 41 for the cache mishit of each bank, it is not necessary to use the shift of the cycles among the banks. That is, each bank has an independent request queue in which the next request issued from the IP is held. It means that an idle dummy cycle is not required to be provided when the access request is sent out of the IP.

The operation roughly described above will now be set forth in detail.

The requests from the IP-0 and the IP-1 are temporarily saved in the request stacks 26 and 27 for the IP-0 through the request signal lines 24 and 25 for the IP-0, respectively. The request contains an address of the MS. The stack 26 or 27 is an FIFO memory. The flip-flop 10 or 11 indicates which of the instruction processors IP issues the request. The gate 12 or 13 receives a control signal from the stack busy circuit 29 through a signal line 109. This operation will be discussed below.

The request receiving circuit 28 receives requests from the stacks 26 and 27 based on the predetermined priority if the requests reach there at a time. If the indication of receiving only the request from one of the stacks is given to the circuit 28 through a signal line 108 leading from the MS access control circuit 30, the circuit 28 serves to receive only the request from the indicated stack. A receiving circuit 14 selects a signal indicating the instruction processor IP for the indicated stack through a flip-flop 10 or 11 and outputs it to the signal line 107.

The request received by the request receiving circuit 28 is sent to a directory RAM 32 and a comparator 16, in which case the request to be sent to the RAM 32 and the comparator 16 is divided on the known set associative mapping so that some bits of the address contained in the request are given to the portion 101 and the other bits are given to the portion 102. The RAM 32 stores a different address bit from the address bit sent through the signal line 101. The bit information given through the signal line 101 is read as an address from the RAM 32. The comparator 16 operates to compare the informations sent through the signal lines 102 and 103 with each other. If both are matched, the comparator 16 determines that the request data exists in the CS and issues a cache hit signal. If both are not matched, the comparator 16 issues a cache mishit signal through a signal line 105.

If the cache mishit signal is sent on the signal line 105, the MS access control circuit 30 transfers the request sent on the signal line 100 to the MS through the signal line. At a time, to keep the order of the requests from the same instruction processor IP, the control circuit 30 receives the information indicating the instruction processor IP for issuing the mishit request through the signal line 107 and gives to the request receiving circuit 28 through the signal line 108 an indication of inhibiting to select the subsequent request from that instruction processor IP.

A decoder 17 receives two bits of the address from the request on the signal line 100 and gives a signal of specifying which of the banks 33 to 36 the request is to be sent through the signal line 106.

Each of the banks 33 to 36 has the same arrangement. For simplifying the description, the bank 33 will be representatively described below.

The bank 33 receives a pair of informations (107, 100) indicating the request and the IP for issuing the request through the effect of the selecting circuit 18. The selecting circuit 18 operates only when its own bank is selected by a signal from the signal line 106. If the cache hit signal is sent on the signal line 105, the pair of informations is sent to the CSAQ 37 through the signal lines 111 and 112. If the cache mishit signal is sent on the signal line 105 though the own bank is not selected, the bank 33 operates to send the pair of informations to the CSBQ 41. Hence, if the cache mishit takes place, the request is saved in the CSBQ's of all the banks.

The CSAQ 37 or CSBQ 41 is a first-in first-out memory. If no storage space is left in the memory, the CSAQ 37 or CSBQ 41 inputs a value of "1" on the signal line 115 or 116. These two signals are reported to a stack busy monitoring circuit 28 through an OR gate and a signal line 117.

The selecting circuit 45 selects any one of the pair of informations and outputs the request with the access address onto a signal line 119 and the information indicating the instruction processor IP onto a signal line 118. The selection is done on the informations sent on the signal lines 122 and 127.

If the pair of informations is selected in the selecting circuit 45, the bank busy control circuit 53 operates to sense it and outputs a signal "1" onto a signal line 123. The signal "1" represents that the CS bank is busy for a fixed time (two cycles).

A RAM 57 is a memory for reading some bits of the address of the request sent on the signal line 119 as an address. In response to the request from the stack 37, the RAM 57 operates to read the data out. In response to the request from the stack 41, the RAM 57 operates to read the data from the signal line 124.

The selecting circuit 19 operates to send the data read from the cache RAM to the instruction processor IP-0 through a signal line 125 or send the data to the IP-1 through a signal line 126. The switching is done on the information indicating the IP sent on the signal line 118.

A buffer 20 operates to read the data from the main storage MS. If the signal on a signal line 122 has a value of 1, the buffer operates to write the data in the RAM 57. If the signal has a value of "0", the buffer keeps the data therein.

When the cache data write control circuit 49 receives a data transfer signal from the MS to a signal line 121, the circuit 49 inputs a value of "1" onto a signal line 122 if the signal line 123 indicates that the RAM is busy. The data transfer signal serves to indicate the timing of the data 120 to be transferred from the MS to the buffer 20. On the other hand, if the signal line 123 indicates that the RAM is busy, a value of "0" is left on the signal line 122 until the RAM is not busy. When the MS access control circuit 30 receives the data transfer signal on the line 121, the circuit 30 operates to write an address from the IP-0 26 or the IP-1 27 at the location of the RAM 32 specified by the address bit passed on the line 101. The address is sent to the circuit 30 through the lines 101 and 99. Hence, the cache mishit data is written in the RAM 57 and the mishit address is written in the address RAM 32 so that the data may be hit at the next cache access time.

If both of the signal lines 122 and 123 have a value of "0" the selecting circuit 45 selects the pair of informations from the CSAQ 37. If the signal line 122 has a value of "1", the selecting circuit 45 selects the pair of informations from the CSBQ 41.

The stack busy monitoring circuit 29 receives in its display element 21 the status indicating whether or not each bank is busy through the signal line 117 led from each of the banks 33 to 36. The bank-busy status is indicated to the gates 12 and 13 through the signal line 109. The gate 12 or 13 operates to refer to the address bit for specifying the bank, the bit contained in the request from the stack 26 or 27. If the request is issued for the bank reported to be busy through the signal line 109, the monitoring circuit 29 operates to inhibit the request passage of the gate so that the request is held in the stack 26 or 27.

Herein, consider the intentional process of transferring the data from the MS to the buffer 20 at a cycle S2 if the cache mishit takes place in the request for the data issued from the instruction processor IP-0, accessing the bank RAM 0 at cycles S3 and S4 in response to the request R1 from the IP-1, and sending the request R2 from the IP-1 to the bank 1 at a cycle S5.

In this process, since the CSRAM 0 (57) is busy at the cycle S4, the conventional device disables to write the transfer data from the MS in any one of the CSRAM's located in the four banks. Hence, at the next cycles S5 and S6, the data is written in the RAM's 0 to 3 (W0 to W3). The processing of the request received at the cycle S5 is executed at cycles S7 and S8 after doing the data write W1.

Figure 3A:
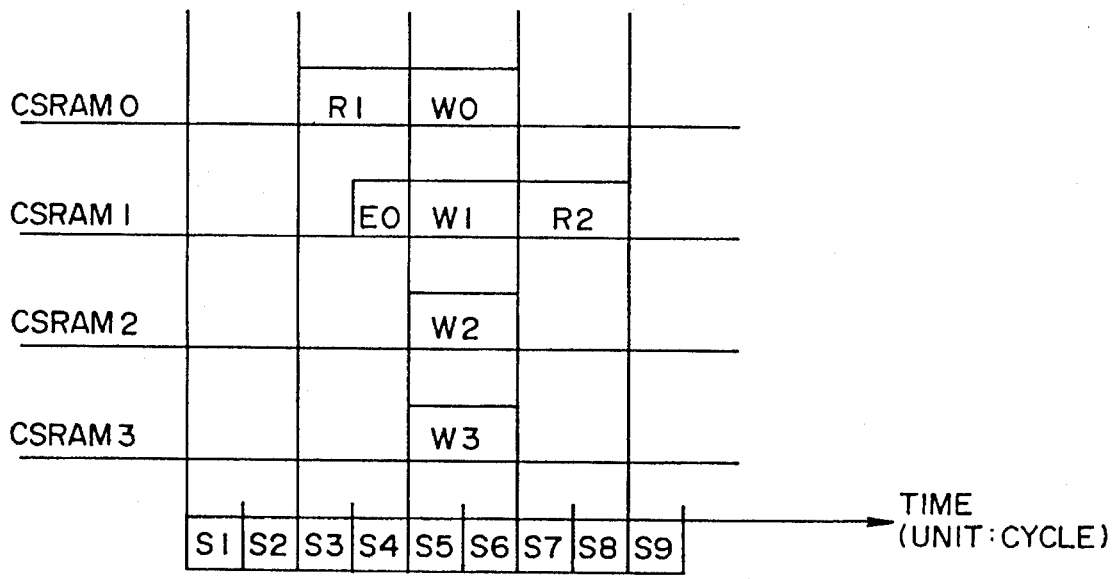
FIGS. 3A and 3B are timing charts showing a comparison of a cache access time between the present invention and the prior art.
Figure 3B:
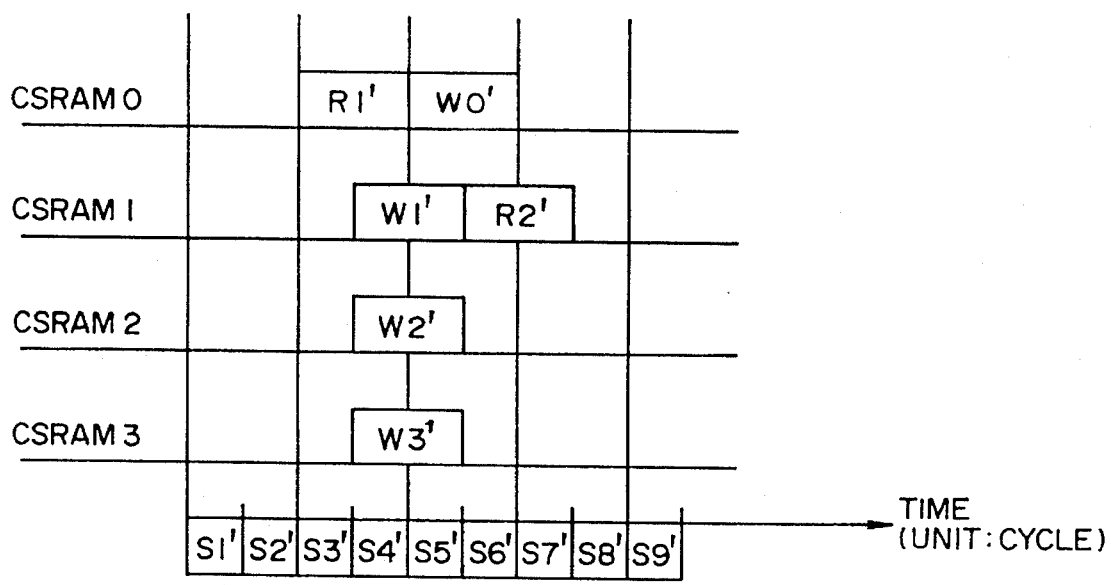

According to the embodiment of the invention, the cache control unit provides a queue CSBQ 41 at each bank so that the request can be held in the bank. As shown in FIG. 3B, therefore, at the CSRAM's 1 to 3 which are not busy at the cycle S4, the data is immediately written (W1' to W3'). Only the CSRAM 0 enables to write the data at the write W0' after the request R1'. The request R2 received at the cycle S5 is processed at the cycles S6' and S7' after the write W1' (R2').

This operation does not bring about the idle cycle E0 which would have taken place in the conventional device and results in reducing all the access operations taken until the termination of the request R2 by one cycle.

What is claimed is:

1. A cache controller comprising:

a cache memory comprising plural banks each including a data array for storing respective parts of data stored in a main storage;

an address array, connected to plural instruction processors (IP's), for holding plural addresses corresponding to data stored in said cache memory thereby to provide one of a hit signal and a mishit signal; and a request stack connected to said address array and for holding access requests from said plural IP's to each one of said plural banks to access said data array in each one of said banks; and means for inhibiting the sending of a request from said request stack to said data array while said data array is accessed by a previous request;

wherein each of said plural banks includes:
a first stack for holding access requests in response to the occurrence of both an access request and said hit signal;
a second stack for holding said access requests in response to the occurrence of both an access request and said mishit signal; and
a data buffer for holding data sent out of said main storage;
wherein said data held in said data buffer is inputted into said data array.

2. The cache controller according to claim 1, further comprising an access control circuit for sending out a data transfer request to said main storage in response to said mishit signal;

monitoring means for indicating data transferred from said main storage; and a selecting circuit for sending out the request to said data array in response to an output of any one of said first and second stacks, based on an output indication of said monitoring means.

3. The cache controller according to claim 1, further comprising:

a receiving circuit connected to said plural IP's and for selectively receiving the access request from one of said IP's; and a busy monitoring circuit connected to said request stack and for feeding an inhibit signal for disabling said receiving circuit to receive said access request while said request stack is full.

4. The cache controller according to claim 1, further comprising:

a decoder for generating a signal indicating a distinction among said plural banks in response to said access request, wherein each of said plural banks includes a selecting circuit for selectively entering said access request to said request stack of one of said plural banks when an output signal of said decoder maintains a predetermined condition.

5. A cache memory control unit comprising:

a cache memory comprising plural banks each including a data array;

address array means for providing one of a hit signal and a mishit signal for indicating whether or not said cache memory holds data according to any one of access requests for said cache memory received from plural instruction processors; and data transfer request means for sending out a request of transferring the data to a main storage in response to said mishit signal;

each of said plural banks including:

a first stack for holding said access requests in response to both an access request and said hit signal; and a second stack for holding said access requests in response to both an access request and said mishit signal;

a data buffer for holding data sent out of said main storage;

transfer data monitoring means for monitoring data sent out from said main storage according to said data transfer request for said main storage, accessing said data array by said access request from said first stack while data is not sent out from said main storage, and sending out data from said data array to any one of said plural instruction processors;

wherein said transfer data monitoring means operates to access said data array by using said access request from said second stack according to the data sent out of said main storage in response to said data transfer request for said main storage and to write the data sent out of said main storage to said data array of each of said plural banks.

6. The cache memory control unit according to claim 5, wherein said transfer data monitoring means further includes busy signal means for generating a busy signal for a predetermined number of instruction cycles after said data array is accessed by one of said access requests held in said first and second stacks.

7. The cache memory control unit according to claim 5, further comprising means for sending a processor signal indicating one of said plural instruction processors which said access request is sent from, said means being connected to said plural instruction processors, and wherein said transfer data monitoring means has a selecting circuit for sending out data from said data array to one of said plural instruction processors in response to the output from said processor signal sending means.

8. The cache memory control unit according to claim 5, further comprising a stack busy monitoring circuit being connected to said first and second stacks of said plural banks and for giving, when one of said first stack and said second stack contained in one of said plural banks is full, an instruction inhibit signal inhibiting issuance of said access request from said instruction processor to said one of said plural banks.

9. A cache memory control unit having a capability of processing requests from plural instruction processors and accessing a cache memory based on a retrieved result of a director section, said cache memory control unit comprising:

a cache memory comprising plural banks, each of which includes a data array for holding part of data stored in a main storage, wherein said director section stores a main storage address of data stored in said cache memory;

a request stack in each of said plural banks for holding plural requests from said directory section to a subject bank;

means for indicating whether or not a data array in said bank is busy being accessed; and means for inhibiting giving a request from said request stack to said data array if said data array is busy, wherein said request stack in each of said plural banks includes:

a first request queue for queuing said requests for data held in said data array of the bank based on the data requested by an instruction processor;

a second request queue for queuing requests for data not held in said data array of the bank based on data requested from an instruction processor; and means for giving a request from said first request queue to said data array of the bank when said data array is not busy and when no data is transferred from said main storage; and means for giving a request from said second request queue to said data array when said data array is not busy and data is transferred from said main storage.

10. The cache memory control unit according to claim 9 wherein said data array in each of said banks includes a buffer for temporarily holding data from said main storage when said data array is busy.

* * * * *